Figure 1:
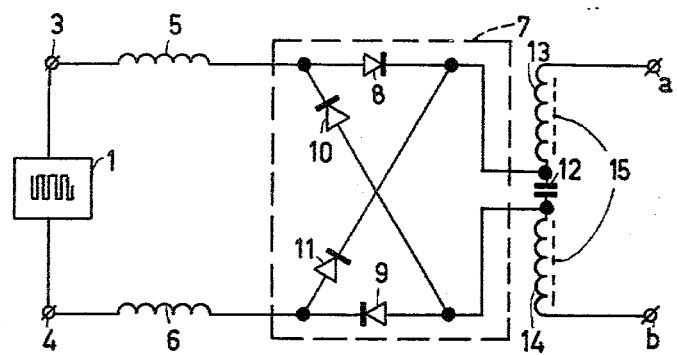

United States Patent [19]

Dijkmans et al.

[11] 4,238,644
[45] Dec. 9, 1980

[54] SUPPLY CIRCUIT FOR A SUBSCRIBER'S LINE CIRCUIT

[75] Inventors: Eise C. Dijkmans, Eindhoven; Klaus-Dieter K. Brockmann, Hilversum, both of Netherlands

[73] Assignee: U.S. Philips Corporation, New York, N.Y.

[21] Appl. No.: 912,453

[22] Filed: Jun. 5, 1978

[30] Foreign Application Priority Data

Mar. 6, 1978 [NL] Netherlands .................. 7802421

[51] Int. Cl.³ .......................................... H04M 19/00
[52] U.S. Cl. ......................................... 179/81 R; 179/77
[58] Field of Search ............ 179/16 F, 18 F, 18 FA, 179/70, 77, 81 R; 363/125, 126, 127, 128

[56] References Cited

U.S. PATENT DOCUMENTS

| 2,357,418 | 9/1944 | Mattheyses | 363/126 |
|---|---|---|---|
| 3,965,447 | 6/1976 | Thomas | 179/81 R |
| 4,084,217 | 4/1978 | Brandli et al. | 363/126 |

*Primary Examiner*—Bernard Konick
*Assistant Examiner*—Joseph A. Popek
*Attorney, Agent, or Firm*—T. A. Briody; W. J. Streeter; Bernard Franzblau

[57] ABSTRACT

A supply circuit for a telephone subscriber's line circuit that includes a voltage source and a supply impedance connected in series with the line to the voltage source for limiting the line current upon short circuit of the line. The supply circuit includes an AC voltage generator, an AC/DC converter, and a circuit for coupling the AC voltage generator to the line via the supply impedance and the AC converter.

10 Claims, 3 Drawing Figures

SUPPLY CIRCUIT FOR A SUBSCRIBER'S LINE CIRCUIT

The invention relates to a telephone supply circuit for a subscriber's line circuit comprising a voltage source and a supply impedance connected to the voltage source in series with the line.

Such a supply circuit is generally known. A transmission bridge is known comprising a transformer provided with two identical primary windings which are arranged in series by means of a capacitor and wherein the supply circuit comprises a d.c. voltage source connected across the capacitor via supply resistors.

The rating of the supply resistors is determined by the value of the voltage supplied by the voltage source and the maximum permissible current that will flow on short-circuiting of the line. For a voltage of 48 V and a maximum permissible line current of 60 mA the value of each of the supply resistors is 400 Ohm.

Such a supply circuit has the drawback that a portion of the power supplied by the supply circuit is dissipated in the supply resistors.

With a customary value of the line current of from 20 to 40 mA this dissipation is approximately 0.3 to 1.3 Watt in every closed subscriber's loop.

It is an object of the invention to provide a relatively simple circuit in which the power dissipation is considerably reduced.

The supply circuit according to the invention is characterized in that the voltage source comprises an a.c. voltage generator and an AC/DC converter connected thereto and at least one reactance through which the alternating current signals supplied by the a.c. voltage generator flow, the reactance constituting a part of the supply impedance.

The invention will be further explained with reference to the embodiments shown in the accompanying drawings in which, corresponding components in the various Figures have been given the same reference numerals.

Figure 2:
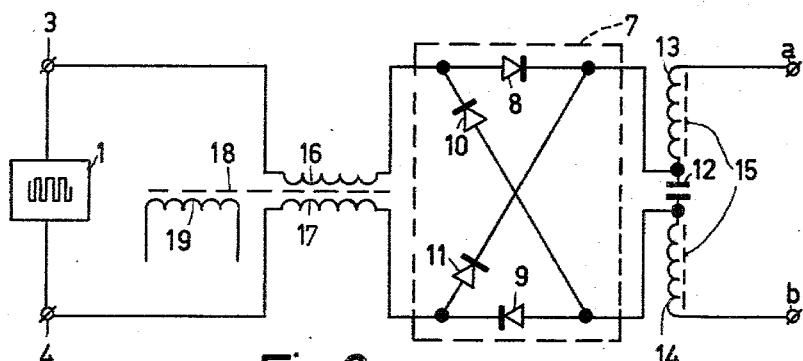
Figure 3:
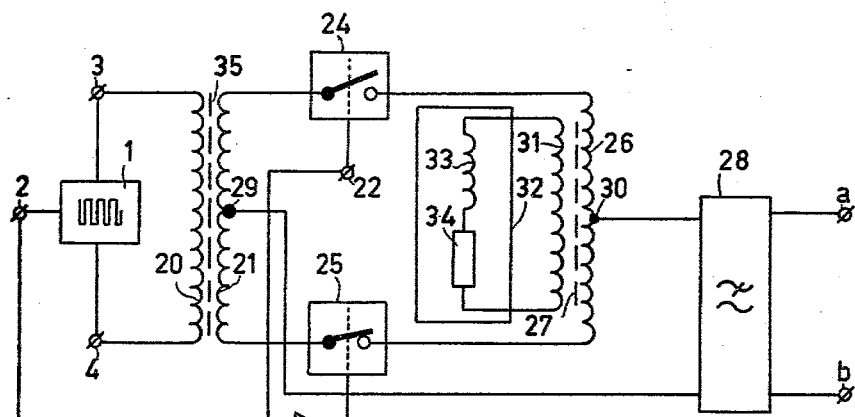

In the drawings:

FIG. 1 shows an embodiment of a supply circuit for a subscriber's line circuit according to the invention, FIG. 2 shows an embodiment of the supply circuit modified relative to the circuit shown in FIG. 1 for the purpose of loop current detection, and FIG. 3 shows another embodiment of a supply circuit according to the invention.

The embodiment shown in FIG. 1 of a telephone supply circuit comprises an a.c. voltage generator including a pulse signal generator 1. The a.c. voltage generator supplies a pulse-shaped signal having a pulse repetition rate of, for example, 100 KHz. The output terminals 3 and 4 are connected via choke coils 5 and 6 to an AC/DC converter 7 which comprises a diode bridge 8, 9, 10 and 11 in which the pulse signal supplied by the pulse signal generator 1 is rectified. The AC/DC converter 7 is connected across a capacitor 12 of a series arrangement connected between the a and b conductors of a subscriber's loop. The series arrangement includes two primary windings 13 and 14 of a transformer 15 and the capacitor 12. The speech signals occurring on the subscriber's line are transmitted in known manner, for example via a secondary winding, not shown, to a telephone exchange connected to this winding, the speech signals coming from the telephone exchange being transmitted in the same way to the subscriber's line via the transformer 15.

The pulse-shaped signals supplied by pulse signal generator 1 flow through the choke coils 5 and 6 before rectification in the AC/DC converter and produce a voltage drop thereacross proportional to the value of the inductances L of these choke coils multiplied by the pulse repetition rate of the pulse signals. For a permissible short-circuit current of 60 mA on short circuiting of the conductors a and b and with a d.c. voltage of 48 Volts and a pulse repetition rate of 100 KHz the value of each of the inductances is approximately 0.64 m H.

This supply circuit has the great advantage that the inductances do not dissipate power and still protect the supply circuit and the subscriber's line from excessive currents upon short-circuiting of the subscriber's line.

It is obvious that capacitors can be used instead of inductances. However, when designing a supply circuit with capacitors the fact should be taken into account that oscillations of the capacitors with the inductances of the transformers present must be avoided and that in these circumstances there is no d.c. coupling to ground.

FIG. 2 shows an embodiment in which the required supply impedance is constituted by a primary winding 16 and a secondary winding 17 of a transformer 18. This embodiment has the advantage that a measuring device for measuring the state of the subscriber's line can be inductively coupled to the line as has been further explained in another application by Applicants, without requiring many additional means. The measuring device, not shown in the Figure, is then coupled via a further winding 19 of transformer 18 to the current flowing in the subscriber's line. Because the measuring device is coupled with the two other windings 16 and 17 the symmetry of the circuit is maintained so that common mode signals on the subscriber's line cannot generate differentialmode signals at the measuring device.

In FIG. 3 the pulse source 1 is connected to a primary winding 20 of a first transformer 35. The secondary winding 21 of transformer 35 is connected via switches 24 and 25, provided with control inputs 22 and 23, to a primary winding 26 of a second transformer 27. The conductors a and b of the subscriber's line are connected via a low pass filter 28 to centre taps 29 and 30 of the windings 21 and 26.

In addition, an output 2 of the pulse signal generator 1 is directly connected to control input 22 of the switch 24 and to the control input 23 of switch 25 via an inverter. This circuit, which has been extensively described in a copending U.S. application Ser. No. 912,454, filed June 5, 1978, is arranged so that the phase of the pulse-shaped control signal, supplied at output terminal 2, can be adjusted at choice relative to the pulse signal present between the output terminals 3 and 4.

If the control signal supplied at output terminal 2 is in phase with the pulse signal present between the output terminals 3 and 4 then it is easy to see that the potential of the a conductor is positive relative to the potential of the b conductor of the subscriber's line. If the pulse-shaped control signal supplied at output terminal 2 is of opposite phase to that of the pulse signal present between the output terminals 3 and 4, the potential of the conductor a is negative relative to the b conductor.

An impedance 32 is connected to the secondary winding 31 of the second transformer 27. This impedance comprises the series arrangement of a coil 33 and a resistor 34. The resistor 34 is a measuring resistor across which a measuring device is connected in a manner not further explained for measuring the line conditions of the subscriber's loop. Together with the coil 33 this measuring resistor protects the supply circuit on short circuiting of the subscriber's line. To keep the dissipation as small as possible the value of the measuring resistor is chosen as low as possible and the value of the inductance is chosen as high as possible, the total impedance having a modulus equal to 800 Ohm. Via the second transformer the direct current resistance of the subscriber's line is connected in series with the coil 33 and the measuring resistor 34.

The slope of the pulse signals flowing through this series arrangement is reduced by the time constant L/R of this series arrangement, L being the inductance of coil 33 and R the sum of the measuring resistor 34 and the direct current resistance of the subscriber's line. So different time constants are associated with different lengths of the subscriber's line. The distortion, introduced by these time constants, of the pulse signals affect the value of the d.c. voltage supplied to the subscriber's line. It should be noted that the low-pass filter 28 suppresses the ripple voltage produced by this distortion. When neglecting a slight influence of filter 28 it follows from the above that the effective internal resistance of the supply circuit as a function of the direct current resistance of the subscriber's line varies, that is to say it decreases when the direct current resistance of the subscriber's line increases. To eliminate the influence of this direct current resistance on the effective internal resistance of the supply circuit a further inductance can be included in parallel with the resistor 34 because an inductance, arranged in parallel with the resistance, furnishes an effective internal resistance of the supply circuit which increases when the direct current resistance of the subscriber's loop increases. By means of a proper choice of the inductance 33 arranged in series with the resistor 34 and the inductance arranged in parallel with the resistor 34 an effective internal resistance of the supply circuit can be obtained which depends to a lesser degree on the direct current resistance of the subscriber's line, which is therefore less dependent on the length of the subscriber's line and which has the value required for current protection upon short-circuiting of the subscriber's line.

What is claimed is:

1. In a telephone supply circuit for a subscriber's line circuit wherein a voltage source and a supply impedance are connected in series with the line to the voltage source for limiting the line current upon short circuit of the line, the improvement wherein the voltage source comprises an a.c. voltage generator having a frequency above the speech band of the line and an AC/DC converter connected to the a.c. generator, means connecting at least one low resistance reactance element in circuit so that the alternating current supplied by the a.c. voltage generator flows through said reactance element to the AC/DC converter, said reactance element constituting a part of the supply impedance and being operative to produce minimum power dissipation by the supply impedance.

2. A supply circuit as claimed in claim 1, wherein the reactance element comprises first and second inductances, and said connecting means connects first and second terminals of the a.c. voltage generator to the AC/DC converter via the first and second inductances, respectively.

3. A supply circuit as claimed in claim 1, wherein the reactance element includes a transformer having a primary, a secondary and a further winding and one of the terminals of the a.c. voltage generator is connected via the primary winding of the transformer to the AC/DC converter and the other terminal of the a.c. voltage generator is connected in an identical manner to the AC/DC converter via the secondary winding, and a measuring device connected to the further winding of the transformer.

4. In a telephone supply circuit for a subscriber's line circuit that includes a voltage source and a supply impedance connected in series with the line to the voltage source for limiting the line current upon short circuit of the line, the improvement wherein the voltage source comprises an AC voltage generator that includes a pulse signal generator and having a frequency above the speech band of the line and an AC/DC converter connected to the AC generator, means connecting at least one reactance element in circuit so that the alternating current supplied by the AC voltage generator flows through said reactance element to the AC/DC converter and with said reactance element constituting a part of the supply impedance, and wherein the AC/DC converter is connected via a first transformer to the pulse signal generator and the AC/DC converter comprises a second transformer and two switches provided with control inputs, one of the switches being connected between one end of a secondary winding of the first transformer and one end of a primary winding of the second transformer, the other switch being connected between the other end of said secondary winding and the other end of said primary winding, means coupling the control inputs of the switches to the pulse source for switching the switches by pulse-shaped control signals derived from the pulse signals and having the same pulse repetition rate as the pulse signals, means coupling the subscriber's line to a center tap of the secondary winding of the first transformer and to a center tap of the primary winding of the second transformer, and means connecting the reactance element together with a measuring resistor to a secondary winding of the second transformer.

5. A supply circuit as claimed in claim 4, wherein the reactance element is connected in series with the measuring resistor and a further inductance is connected in parallel with the measuring resistor.

6. A telephone supply circuit for supplying electric energy to a subscriber's line by means of a supply impedance for limiting the line current occurring upon short circuit of the line comprising, an A.C. voltage generator having a frequency above the speech band of the subscriber's line, the supply impedance including a low resistance reactance means, an AC/DC converter, and circuit means coupling the A.C. voltage generator to the subscriber's line via the reactance means and the AC/DC converter whereby the alternating current supplied by the A.C. voltage generator flows through the reactance means to the AC/DC converter with the reactance means operative to produce minimum power dissipation by the supply impedance.

7. A telephone supply circuit for supplying electric energy to a subscriber's line by means of a supply impedance for limiting the line current occurring upon short circuit of the line comprising, an A.C. voltage generator having a frequency above the speech band of the subscriber's line, the supply impedance including a reactance means comprising first and second inductors, an AC/DC converter, and circuit means coupling the A.C. voltage generator to the subscriber's line via the reactance means and the AC/DC converter whereby the alternating current supplied by the A.C. voltage generator flows through the reactance means to the AC/DC converter, and said circuit means includes means for coupling first and second terminals of the A.C. generator to first and second terminals, respectively, of the AC/DC converter via said first and second inductors, respectively.

8. A telephone supply circuit for supplying electric energy to a subscriber's line by means of a supply impedance for limiting the line current occurring upon short circuit of the line comprising, an A.C. voltage generator having a frequency above the speech band of the subscriber's line, the supply impedance comprising a reactance means including a transformer having a primary, a secondary and a further winding, an AC/DC converter, and circuit means coupling the A.C. voltage generator to the subscriber's line via the reactance means and the AC/DC converter whereby the alternating current supplied by the A.C. voltage generator flows through the reactance means to the AC/DC converter, and said circuit means includes means for coupling first and second terminals of the A.C. generator to first and second terminals, respectively, of the AC/DC converter via the primary and secondary windings of the transformer, respectively, and a measuring device coupled to said further winding of the transformer.

9. A telephone supply circuit as claimed in claim 8 wherein the primary and secondary windings of the transformer are identical and the A.C. generator comprises a pulse voltage source.

10. A telephone supply circuit for supplying electric energy to a subscriber's line by means of a supply impedance for limiting the line current occurring upon short circuit of the line comprising, an A.C. voltage generator comprising a pulse signal generator and having a frequency above the speech band of the subscriber's line, the supply impedance including a reactance means, an AC/DC converter, and circuit means coupling the A.C. voltage generator to the subscriber's line via the reactance means and the AC/DC converter whereby the alternating current supplied by the A.C. voltage generator flows through the reactance means to the AC/DC converter, and wherein the circuit means includes a first transformer having a primary winding coupled to the output of the pulse generator and a secondary winding, and the AC/DC converter comprises a second transformer having primary and secondary windings and two control switches each having a control input, and the circuit means further comprises, means connecting the switches individually between respective ends of the secondary winding of the first transformer and respective ends of the primary winding of the second transformer, means coupling the control inputs of the two switches to the output of the pulse generator so as to switch the switches in phase opposition to one another, and means coupling the subscriber's line to a center tap on the secondary winding of the first transformer and to a center tap on the primary winding of the second transformer, and means coupling the reactance means and a measuring resistor to the secondary winding of the second transformer.

* * * * *